(12) United States Patent
Ostholt

(10) Patent No.: US 11,505,495 B2
(45) Date of Patent: Nov. 22, 2022

(54) METHOD FOR MICROSTRUCTURING A GLASS SUBSTRATE BY MEANS OF LASER RADIATION

(71) Applicant: LPKF Laser & Electronics AG, Garbsen (DE)

(72) Inventor: Roman Ostholt, Langenhagen (DE)

(73) Assignee: LPKF LASER & ELECTRONICS AG, Garbsen (DE)

( * ) Notice: Subject to any disclaimer, the term of this patent is extended or adjusted under 35 U.S.C. 154(b) by 404 days.

(21) Appl. No.: 16/773,998

(22) Filed: Jan. 28, 2020

(65) Prior Publication Data

US 2020/0239361 A1    Jul. 30, 2020

(30) Foreign Application Priority Data

Jan. 29, 2019  (DE) .................. 10 2019 102 145.6
Jan. 15, 2020  (DE) .................. 10 2020 100 848.1

(51) Int. Cl.
| | |
|---|---|
| C03C 15/00 | (2006.01) |
| C03C 23/00 | (2006.01) |
| B23K 26/402 | (2014.01) |
| B23K 26/362 | (2014.01) |
| B23K 103/00 | (2006.01) |

(52) U.S. Cl.
CPC ........ C03C 23/0025 (2013.01); B23K 26/362 (2013.01); B23K 26/402 (2013.01); C03C 15/00 (2013.01); B23K 2103/54 (2018.08)

(58) Field of Classification Search
None
See application file for complete search history.

(56) References Cited

U.S. PATENT DOCUMENTS

| | | | | |
|---|---|---|---|---|
| 5,910,256 | A * | 6/1999 | Tsunetomo | ........ B23K 26/0604 216/11 |
| 6,391,213 | B1 * | 5/2002 | Homola | .................. C03C 15/00 204/192.15 |
| 8,257,603 | B2 * | 9/2012 | Logunov | ................. C03C 15/00 216/87 |
| 8,894,868 | B2 * | 11/2014 | Hooper | ............ H01L 21/76898 216/99 |
| 2016/0059359 | A1 | 3/2016 | Ambrosius et al. | |

(Continued)

FOREIGN PATENT DOCUMENTS

| | | |
|---|---|---|
| DE | 3525661 C2 | 1/1987 |
| DE | 102010004442 A1 | 7/2011 |

(Continued)

*Primary Examiner* — Shamim Ahmed
(74) *Attorney, Agent, or Firm* — Leydig, Voit & Mayer, Ltd.

(57) ABSTRACT

A method for microstructuring a plate-shaped glass substrate by laser radiation includes: introducing one-sided recesses into the glass substrate, in which a focus of the laser radiation forms a spatial beam along a beam axis and in which the laser radiation creates modifications in the glass substrate along the beam axis so that an action of an etching medium subsequently creates the recesses in the glass substrate through anisotropic removal of material in a respective region of the modifications. A chemical composition of the glass substrate is partially changed and thus at least one region of changed properties is created before the action of the etching medium.

7 Claims, 2 Drawing Sheets

(56) References Cited

U.S. PATENT DOCUMENTS

2016/0362331 A1   12/2016  Castle et al.
2017/0022098 A1*  1/2017  Fletcher ................ C03C 21/003
2017/0256422 A1   9/2017  Ambrosius et al.
2017/0305787 A1* 10/2017  Gomez ................ C03C 21/002

FOREIGN PATENT DOCUMENTS

JP         2018522804 A  *  8/2018
WO   WO 2014161534 A2   10/2014
WO   WO 2016041544 A1    3/2016

* cited by examiner

METHOD FOR MICROSTRUCTURING A GLASS SUBSTRATE BY MEANS OF LASER RADIATION

CROSS-REFERENCE TO PRIOR APPLICATIONS

Priority is claimed to German Patent Application No. DE 10 2020 100 848.1, filed Jan. 15, 2020, and to German Patent Application No. DE 10 2019 102 145.6, filed Jan. 29, 2019. The entire disclosures of the foregoing applications are hereby incorporated by reference herein.

FIELD

The invention relates to a method for microstructuring an in particular plate-shaped glass substrate by means of laser radiation by introducing, in particular, one-sided recesses into the glass substrate as non-penetrating blind holes, or for reducing the material thickness of the glass substrate and for weakening the material, in which the focus of the laser radiation forms a spatial beam along a beam axis of the laser radiation and in which the laser radiation creates modifications in the glass substrate along the beam axis so that the action of an etching medium and successive etching subsequently create the microstructures or recesses in the glass substrate through anisotropic removal of material in the respective region of the modifications.

BACKGROUND

The generic method for precision machining of glass by laser-induced deep etching has become known as LIDE.

In the laser-induced deep etching known from, for example, WO 2014/161534 A2, a transparent material, for example a glass plate, is modified by means of a laser pulse or a pulse sequence over an oblong region along the beam axis, frequently over the entire thickness of the transparent material, and is subsequently anisotropically etched in a wet chemical etching bath.

A method for introducing a recess, for example a blind hole, into a plate-shaped glass substrate by means of laser radiation is known from WO 2016/041544 A1, wherein the action of an etching medium causes anisotropic material removal in the modified regions of the glass substrate through successive etching.

DE 10 2010 004 442 B4 further discloses an optical component for optical waveguiding having a waveguide pattern integrated into a glass substrate, said pattern formed, in particular, by field-assisted ion diffusion. The optical waveguides are preferably produced as multimode waveguides.

DE 35 25 661 C2 also relates to a method for easily carrying out field-assisted ion exchange in a glass substrate material, for example of inorganic glass or of inorganic crystalline solids.

However, a disadvantage of laser-induced etching methods has proven to be that the etching basically acts homogeneously over the entire material thickness of the glass substrate in the modified regions, which in particular favors the production of through-holes. However, structures that differ from this, for example structures for producing blind holes or other one-sided recesses, require additional measures for controlling the etching effect on the opposite sides, for example by means of an etch resist.

SUMMARY

In an embodiment, the present invention provides a method for microstructuring a plate-shaped glass substrate by laser radiation, comprising: introducing one-sided recesses into the glass substrate, in which a focus of the laser radiation forms a spatial beam along a beam axis and in which the laser radiation creates modifications in the glass substrate along the beam axis so that an action of an etching medium subsequently creates the recesses in the glass substrate through anisotropic removal of material in a respective region of the modifications, wherein a chemical composition of the glass substrate is partially changed and thus at least one region of changed properties is created before the action of the etching medium.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
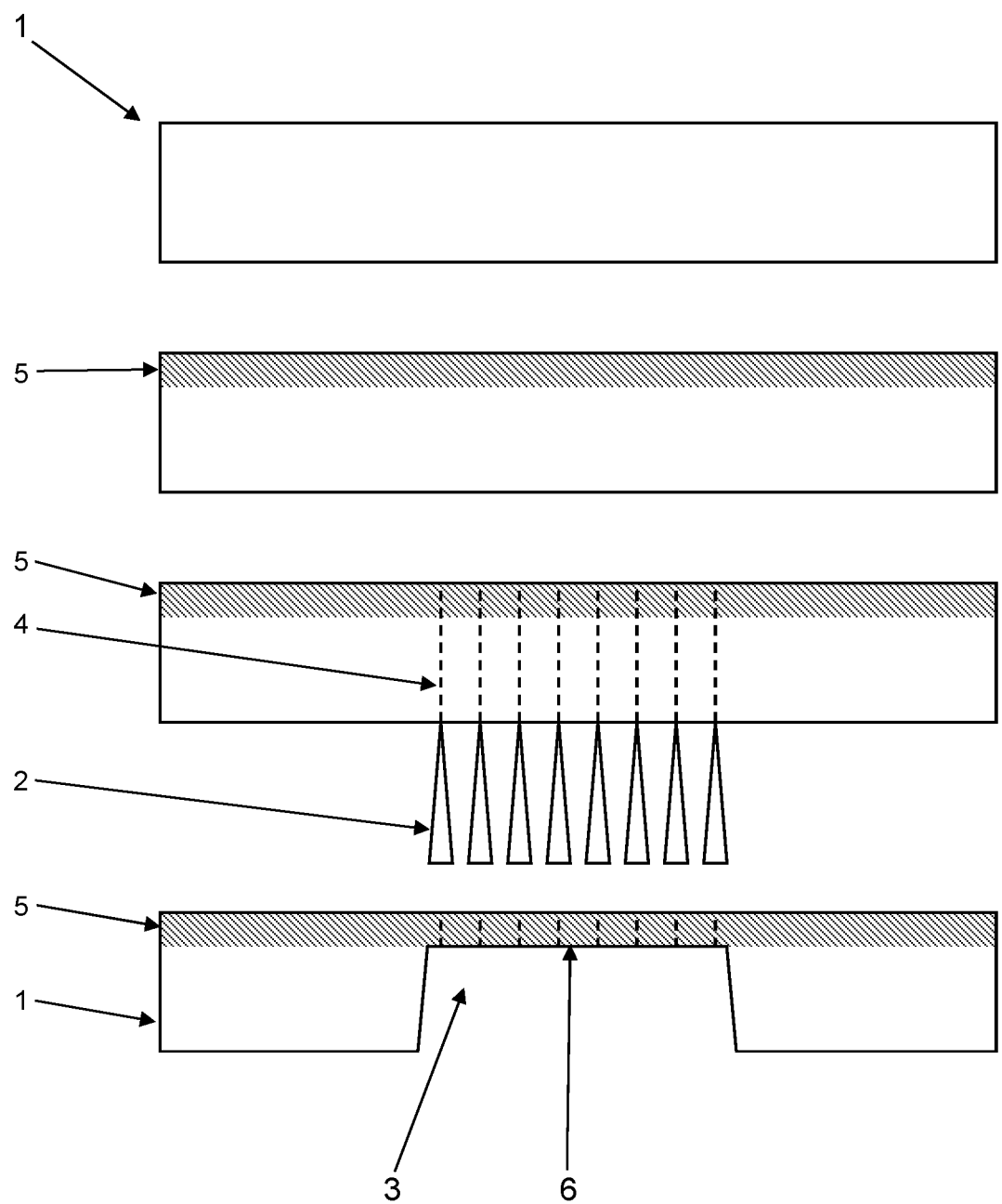
FIG. 1 shows a sequence of the process steps for carrying out the method for microstructuring a glass substrate.

In an embodiment, the present invention provides a possibility of achieving a controllable, in particular inhomogeneous, etching process in the modified regions as needed. In particular, the etching depth, for example, should be adjustable without difficulty.

According to the invention, a method is thus provided in which the chemical composition of the glass substrate is partially changed before the action of an etching medium, thereby creating at least one region of changed properties and one region of unchanged properties of the glass substrate. The chemical or physical properties produced by the changed composition and thus differing in this region accordingly lead to differing modifications. Consequently, the etching rate during subsequent action of the etching medium and the material removal are also changed accordingly. Due to the two-stage nature of the LIDE process, which is used primarily for microstructuring glass substrates, the changed etching rate can be used to produce certain structures which hitherto could not be produced or could only be produced with very substantial effort. The depth of the modifications and thus the amount removed by etching can be controlled by the changed properties in such a way, for example, that the resulting recesses are formed only to a common level, that is to say, are bounded by a planar surface of the glass substrate, and in particular are not formed by a sequence of conical depressions as in the prior art. Specific contours can of course also be produced in this way by means of a plurality of regions, each with different properties. For example, such regions can be introduced into the glass substrate contiguously, adjacently to one another, or at a distance from one another. The essential advantage of the method according to the invention is that the modifications, which in the LIDE method are in principle formed continuously along the beam axis inside the glass substrate between the exterior surfaces, are stopped by the change in the chemical composition or their physical properties at the level of the region with the changed properties but are at least delayed in such a way that further modification and thus subsequent etching practically does not occur in this region. In particular, it is also possible to create regions in this way which are protected from unwanted modification, wherein these regions can, if needed, also be produced in only part of the main plane of extent of the glass substrate and in particular need not necessarily extend over the entire surface.

The composition of the glass substrate could be changed after the introduction of the modifications so that material removal in the etching bath is correspondingly accelerated or delayed due to the changed composition. This also allows changes to be made to the composition of the glass substrate that would otherwise also lead to a change or impairment of the modifications in those regions not affected by the change in composition of the glass substrate and would therefore influence the process in undesired ways. In contrast, a particularly advantageous embodiment of the method according to the invention is an embodiment in which the chemical composition of the glass substrate is partially changed before introducing the modifications into the glass substrate so that the laser radiation acting on the glass substrate along the beam axis and the associated modifications are interrupted at the level where the chemical composition of the glass substrate changes.

According to a further advantageous embodiment of the method, the transmittance of the glass substrate in respect to light of the wavelength of the laser beam is not interrupted along the beam axis, but only the modifications created by the laser radiation are prevented or at least substantially delayed. For this purpose, the laser radiation penetrates along the beam axis both at least one region of changed properties and at least one region of unchanged properties of the glass substrate.

The composition can be changed by means of chemical or physical methods known per se. A particularly promising embodiment of the method according to the invention is achieved by changing the chemical composition of the glass substrate by diffusing ions into it, wherein the ions penetrate into the glass surface through diffusion or ion exchange to the desired layer thickness or depth of the glass substrate. For example, silver ions can be introduced into the glass substrate for this purpose by physical or chemical methods. One physical method for the subsequent introduction of silver ions into the glass substrate is ion implantation. Silver ions accelerated by an electric field can be implanted into regions of glass close to the surface. Appropriate execution allows silver particles to form. Chemically, alkali ions of the glass substrate are replaced by other ions, for example silver ions. With appropriate process control, ion exchange can extend deep into the interior of the glass substrate. For example, metallic silver can be applied directly to the exterior surface of the glass substrate under oxidizing conditions, wherein oxidized silver migrates into the glass during ion exchange. It is possible to modify the ion exchange by electrochemical process control.

The glass substrate is preferably changed by diffusion or ion exchange of silver ions in that $Ag^+$ ions penetrate into the glass substrate to the desired layer thickness.

In this case, it has already proven to be particularly practical if the region of changed properties extends between an exterior surface and an, in particular, parallel plane spaced between the opposite exterior surfaces, wherein the region respectively has a distance to the two opposite exterior surfaces or can be bounded by an exterior surface of the glass substrate.

It is particularly advantageous here to introduce the modifications such that they extend into the region of changed properties or end there. Because of the changed properties of the glass substrate with respect to the modifications to be introduced, subsequent etching reliably ends at the boundary layer to the region.

Another particularly practical embodiment of the invention is achieved in that the modified glass substrate is immersed in an etching bath and etched isotropically. Etching takes place much more quickly in the region of the modifications in the glass substrate and ends at the boundary layer or is substantially delayed there, as a result of which blind holes are formed even if etching takes place on all sides.

In a preferred variant of the method, the introduction of ions is additionally controlled by applying an electrical voltage to opposite sides of the glass substrate, determining the penetration depth of the ions in this way. For this purpose, an electrical voltage is applied to two electrodes which are arranged on opposite sides of the glass substrate. The electrical voltage causes the ions to diffuse deeper and/or more rapidly into the glass substrate. This allows the position of the diffusion layer, as the region of modifications in the glass substrate, to be controlled very accurately. In the subsequent LIDE process, wet chemical etching is stopped at the diffusion layer created in this way.

Figure 2:
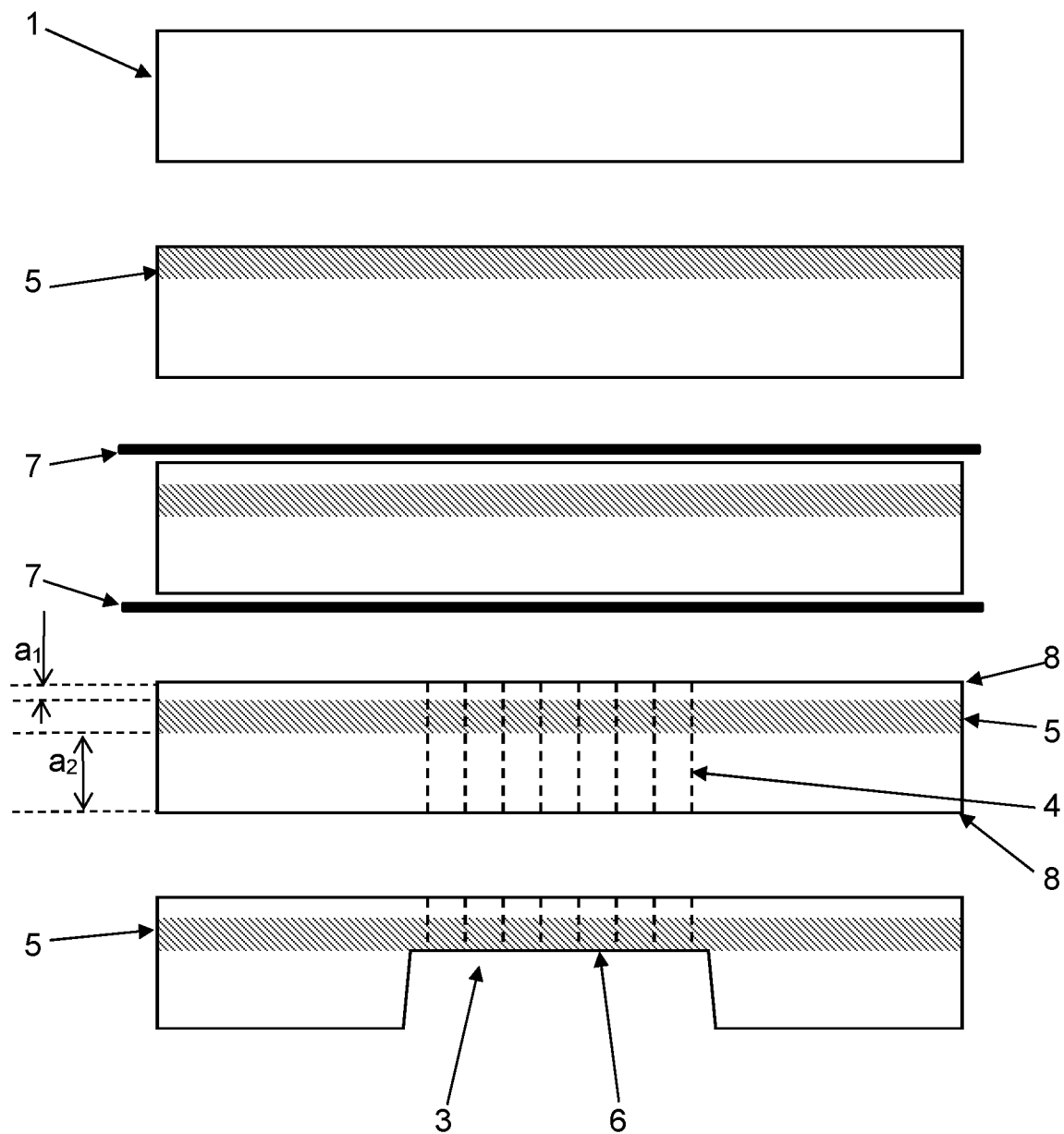
FIG. 2 shows a sequence of the process steps for carrying out the method modified by applying an electrical voltage.

The method according to the invention for microstructuring a plate-shaped glass substrate 1 by means of laser radiation 2 according to the LIDE method known per se is explained in more detail below with reference to FIGS. 1 and 2. The method serves in particular for introducing a one-sided recess 3 into the glass substrate 1 as a non-penetrating blind hole. The focus of the laser radiation forms a spatial beam along a beam axis of the laser radiation so that modifications 4 are created in the glass substrate 1 along and concentrically to the beam axis. The action of an etching medium leads to anisotropic removal of the material of the glass substrate 1 thus modified by successive etching, producing the desired recess. In the methods known from the prior art, blind holes are generated in that the modifications 4 are not produced continuously but only up to a predetermined depth by controlling the focus of the laser radiation 2 accordingly. Planar recesses 3 can accordingly be produced by a plurality of adjacent modifications 4 and by merging blind holes in the subsequent etching treatment. However, no planar boundary surface is formed in this case. Instead, the boundary surface is uneven and rough because conical depressions form. Such methods are not suitable, for example, for producing thin glass substrates 1 which can be used as glass membranes. In the invention, in contrast, the chemical composition of the glass substrate 1 is partially changed prior to the action of an etching medium and prior to the introduction of the modifications 4 into the glass substrate 1, and thus at least one region 5 of changed properties is created in which modification is stopped or greatly delayed. Consequently, the etching rate during subsequent action of the etching medium and the material removal are also changed accordingly. In the etching process, etching therefore does not continue anisotropically along the beam axis when the region 5 is reached but instead acts there only in an isotropic, planar, and at the same time strongly delayed manner so that the region 5 forms a planar boundary surface 6 for the recess 3. Further modification and therefore subsequent etching practically do not occur within this region 5.

In a preferred variant of the method, during or after the diffusion of ions into the glass substrate 1, an electrical voltage is additionally applied to two electrodes 7 arranged on opposite sides of the glass substrate 1. Due to the electrical voltage, the ions diffuse deeper into the glass substrate 1. As a result, the position of the diffusion layer, as the region 5 of changed properties within the volume of the glass substrate 1, and thus the distance $a_1$, $a_2$ between the region 5 and each exterior surface 8 of the glass substrate 1 can be precisely controlled. In the subsequent LIDE process, wet chemical etching is stopped at the boundary layer to this region 5.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Glass substrate
2 Laser radiation
3 Recess
4 Modification
5 Region
6 Boundary surface
7 Electrode
8 Exterior surface
$a_1$, $a_2$ Distance

What is claimed is:

1. A method for microstructuring a plate-shaped glass substrate by laser radiation, comprising:
    at least partially changing a chemical composition of the glass substrate so as to create at least one region of changed properties before an action of an etching medium;
    introducing one-sided recesses into the glass substrate, in which a focus of the laser radiation forms a spatial beam along a beam axis and in which the laser radiation creates modifications in the glass substrate along the beam axis so that the action of an etching medium subsequently creates the recesses in the glass substrate through anisotropic removal of material in a respective region of the modifications,
    wherein the laser radiation penetrates along the beam axis in both at least one region of changed properties and at least one region of unchanged properties of the glass substrate.

2. The method according to claim 1, wherein the chemical composition of the glass substrate is changed by introducing ions.

3. The method according to claim 2, wherein a penetration depth of the ions is controlled by applying an electrical voltage to opposite sides of the glass substrate.

4. The method according to claim 1, wherein the glass substrate is changed by diffusion or ion exchange of silver ions.

5. The method according to claim 1, wherein the at least one region of changed properties extends between an exterior surface and a parallel plane spaced between opposite exterior surfaces.

6. The method according to claim 1, wherein the modified glass substrate is immersed in an etching bath and etched isotropically.

7. A glass substrate produced by the method according to claim 1, wherein the glass substrate comprises a glass membrane.

* * * * *